United States Patent [19]
Hwang

[11] Patent Number: 5,561,813
[45] Date of Patent: Oct. 1, 1996

[54] CIRCUIT FOR RESOLVING I/O PORT ADDRESS CONFLICTS

[75] Inventor: Shih-Tsung Hwang, San Jose, Calif.

[73] Assignee: Advanced System Products, Inc., San Jose, Calif.

[21] Appl. No.: 111,191

[22] Filed: Aug. 27, 1993

[51] Int. Cl.⁶ .................................................. G06F 13/00
[52] U.S. Cl. .............. 395/829; 340/825.07; 340/825.52; 395/834; 395/835; 395/836; 395/284; 364/DIG. 1; 364/238.3; 364/280.2
[58] Field of Search .................. 340/825.07, 825.52; 364/DIG. 1, DIG. 2; 395/200, 275, 325, 400, 800, 200.1, 828, 829, 830, 834, 835, 836, 284, 490, 497.1, 700

[56] References Cited

U.S. PATENT DOCUMENTS

| | | | |
|---|---|---|---|
| 4,124,888 | 11/1978 | Washburn | 395/828 |
| 4,633,392 | 12/1986 | Vincent et al. | 395/325 |
| 4,660,141 | 4/1987 | Ceccon et al. | 395/275 |
| 4,675,813 | 6/1987 | Locke | 395/829 |
| 4,730,251 | 3/1988 | Aakre et al. | 395/325 |
| 4,773,005 | 9/1988 | Sullivan | 395/275 |
| 4,775,931 | 10/1988 | Dickie et al. | 395/829 |
| 4,899,274 | 2/1990 | Hansen et al. | 395/200 |
| 5,014,193 | 5/1991 | Garner et al. | 395/830 |
| 5,038,320 | 8/1991 | Heath et al. | 395/275 |
| 5,274,771 | 12/1993 | Hamilton et al. | 395/275 |
| 5,301,276 | 4/1994 | Kimura | 395/275 |
| 5,317,093 | 5/1994 | Cuenod et al. | 395/829 |
| 5,367,640 | 11/1994 | Hamilton et al. | 395/275 |
| 5,402,528 | 3/1995 | Christopher et al. | 395/109 |
| 5,410,717 | 4/1995 | Floro | 395/800 |
| 5,428,748 | 6/1995 | Davidson et al. | 395/829 |
| 5,434,562 | 7/1995 | Reardon | 340/825.34 |

OTHER PUBLICATIONS

*Texas Instruments SN75C091A SCSI Bus Controller Data Manual*, Texas Instruments, Inc., 1990.
Biagioni, E. et al., "Designing a Practical ATM Lan" in IEEE Network, vol. 7, No. 2 (Mar. 1993) pp. 32–39.

*Primary Examiner*—Lance Leonard Barry
*Attorney, Agent, or Firm*—Skjerven, Morrill, MacPherson, Franklin & Friel; Alan H. MacPherson; David T. Millers

[57] ABSTRACT

An input/output port address selection circuit for a device that couples to a local bus of a computer operates in two modes. In a first mode, the I/O port address is maintained as the last I/O port address saved. In the second mode, the selection circuit changes the I/O port address and saves the change when the circuit is reset. A computer user resolves I/O port address conflicts by placing the selection circuit in the second mode then resetting the system until the conflict is resolved and the system works properly. The selection circuit is then placed and left in the first mode so that the non-conflicting address is reused. Non-volatile memory, an electrically erasable-programmable read-only memory, is used for saving an index which indicates the last I/O port address set. The non-volatile memory is changed when the selection circuit is operated in the second mode.

9 Claims, 4 Drawing Sheets

CIRCUIT FOR RESOLVING I/O PORT ADDRESS CONFLICTS

CROSS-REFERENCES TO RELATED APPLICATIONS

This application incorporates by reference, U.S. Pat. Application entitled "SCSI BUS CONTROLLER WITH STORAGE FOR PERIPHERAL DEVICE CONFIGURATION DATA", Ser. No. 08/111,193, now abandoned, and U.S. Pat. Application entitled "INTEGRATED MULTI-THREADED HOST ADAPTER", Ser. No. 08/111,192, both filed on the same date as the present application.

BACKGROUND OF THE INVENTION

1. Field of the Invention

This invention relates to circuits for resolving address conflicts between devices coupled to a local bus of a computer.

2. Description of Related Art

Small computers often include cards and other devices that attach to a local bus inside the computer. For example, in an IBM personal computer or compatible computer (PC), plug-in cards communicate with a mother board of the PC through standardized local buses, such as industry standard architecture (ISA), extended industry standard architecture (EISA), peripheral component interconnect (PCI), and video electronic standard association (VESA) buses. Each type of local bus has unique protocols and data transfer capabilities. FIG. 1 shows a host computer 100 with a mother board 110. Mother board 110 typically contains a Central Processing Unit (CPU), main memory, and the essential elements needed for operation of computer 100. Local bus 120 allows mother board 110 to communicate with devices 121–123. Devices 121–123 are typically circuit boards or cards inserted into slots attached to local bus 120. Some of typical devices attached to a local bus include video cards, modems, disc controllers, and SCSI adapters such as 123. Instead of a single local bus 120 as shown in FIG. 1, a computer may have two or more different local buses, for example a VESA bus for devices that require a high data transfer rate and an ISA bus for slower devices.

Each device 121–123 on local bus 120 has input/output (I/O) port addresses which are determined by circuitry in the device 121, 122, or 123. Each device 121–123 responds to address signals on local bus 120 which correspond to any of the I/O port addresses used by the device. For example, each device coupled to a VESA bus occupies sixteen consecutive bytes of the computers address space starting with a base I/O port address, and each device responds to any of the sixteen addresses.

Because the total amount of address space available for devices connected to all the local buses is limited, two devices sometimes try to use the same addresses and a conflict arises. Conflicting addresses are typically discovered after devices are connected to local bus 120 and after computer 100 crashes. Computer users are then left to determine what happened and how to correct the problem.

Typically, devices 121–123 have jumper wires or switches which permit a user to change a device's base I/O port address to avoid or resolve a conflict. However, changing device addresses requires knowledge of devices 121–123 coupled to bus 120 and devices connected to other local buses if there are any. Users must identify at least one of the two or more devices that use the same I/O port address. Usually, the last device added to the local bus will be the problem, but if several devices are added at one time, identifying the conflicting devices may be difficult. Once a device is identified, the base I/O port address must be changed to an address that is not used by any other devices on any of the local bus. The user either determines the addresses of the other devices or keeps changing the jumpers or switches until an I/O port address is found that works.

Many computer users are hesitant to change switches or jumper wires on a device inside a computer. Accordingly, a more user friendly way of resolving I/O port address conflicts is needed. The resolution should not require the user to know the I/O port addresses of devices and should require minimal changing of switches or jumpers.

SUMMARY OF THE INVENTION

In accordance with the present invention, an I/O port address selection circuit is provided for a device that couples to a local bus of a computer. The I/O port address selection circuit is operable in two modes. In a first mode, the I/O port address is maintained as the last I/O port address saved. In the second mode, the selection circuit changes the I/O port address of the device every time the device is reset.

A user can resolve I/O port address conflicts by placing the I/O selection circuit in the second mode then resetting the device one or more times until the system works properly. The device can then be placed and left in the first mode so that the non-conflicting address is reused when the device starts-up.

One embodiment of the invention is a device for connection to a local bus. The device includes a local bus interface circuit, active device circuitry, and an I/O port address selection circuit which provides to the bus interface circuit a signal indicating an I/O port address. The device also typically includes a switch or jumper for switching an address selection circuit between the first and second modes.

The address selection circuit typically includes non-volatile memory for storing an index that indicates the last I/O port address and control circuitry which generates a signal indicating an I/O port address. The address selection circuit operates in two modes during initialization. In the first mode, an index value stored in non-volatile memory determines the signal generated by the control circuitry, and in the second mode, the control circuitry changes the index stored in non-volatile memory then uses the changed index to determine the signal generated. Typically, registers are used to hold the index value and the I/O port address used in the address selection circuit. An address list circuit is employed in the control circuit to generate the I/O port address signals which are determined by the index value.

This invention will be more fully understood in view of the following detailed description taken together with the drawings.

BRIEF DESCRIPTION OF THE DRAWINGS

Identical or similar items in different figures are given the same reference number

DETAILED DESCRIPTION OF THE PREFERRED EMBODIMENTS

Figure 1:
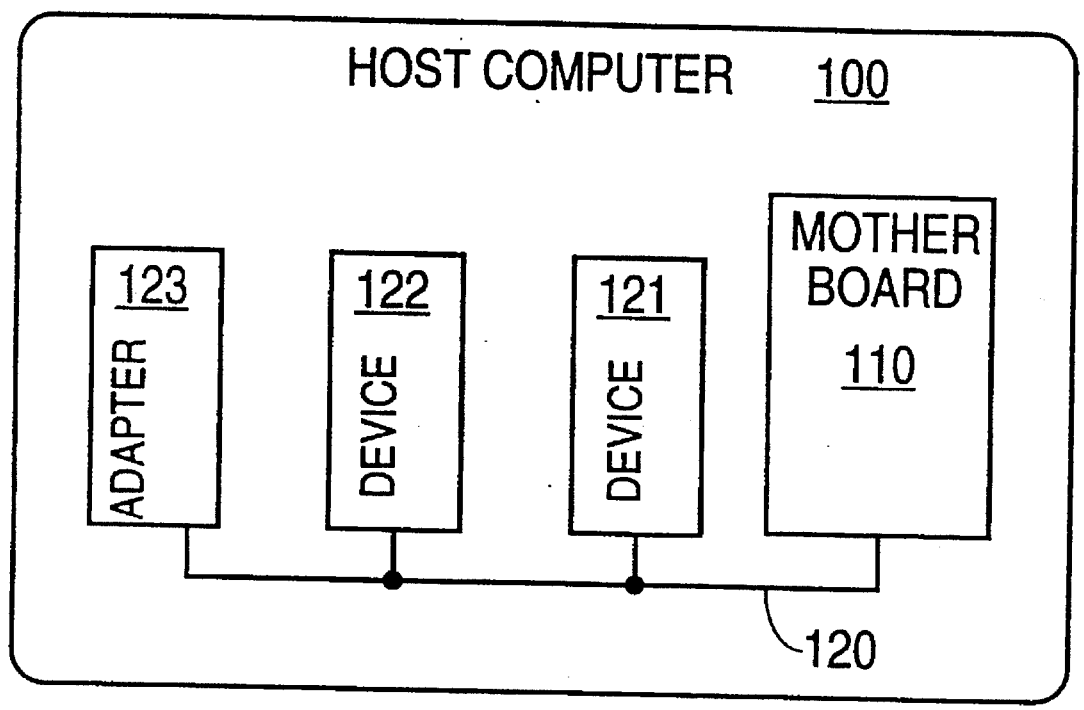
FIG. 1 shows a system in which a host computer communicates with peripherals attached to an SCSI bus
Figure 2:
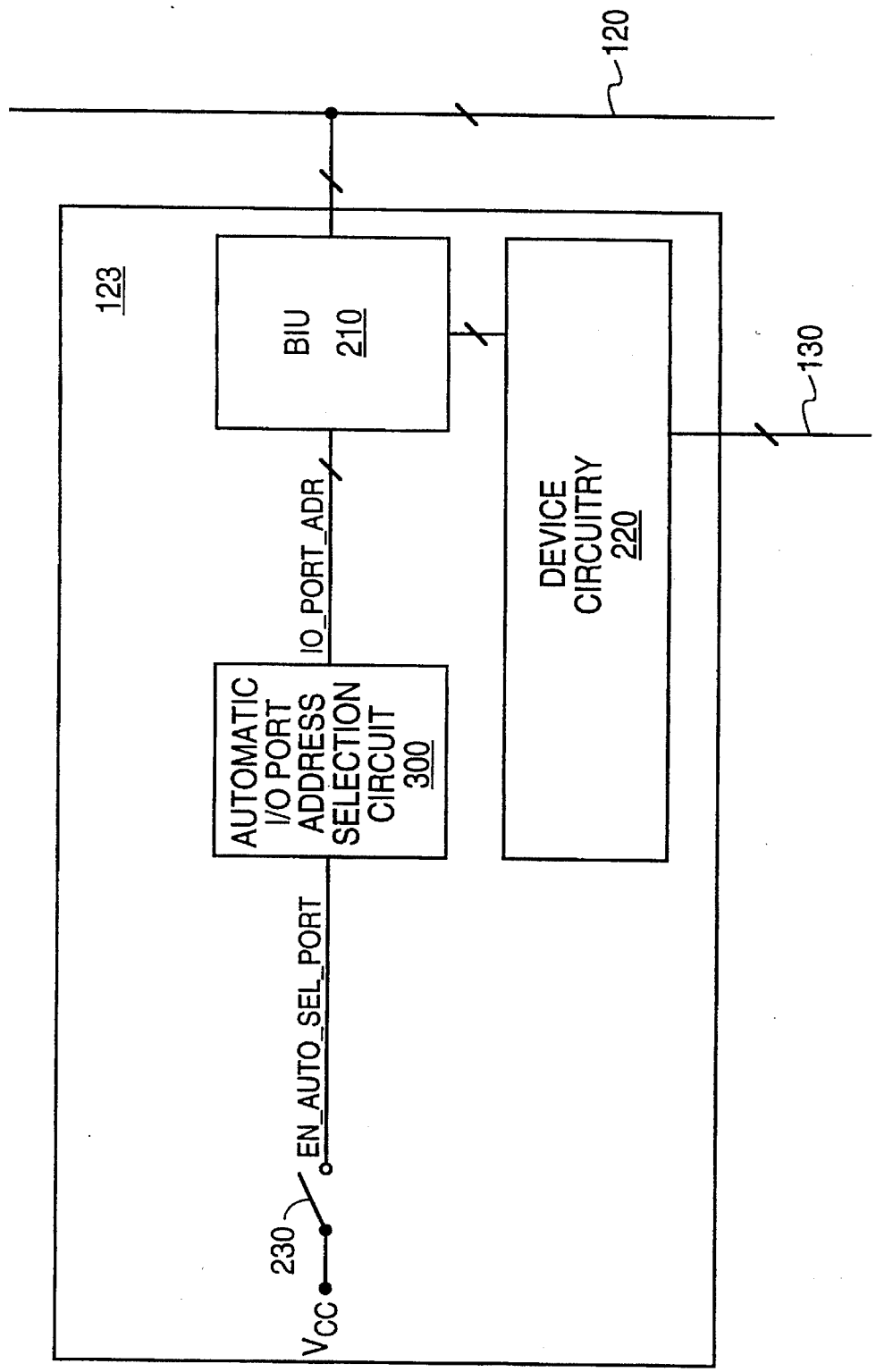
FIG. 2 shows a block diagram of a device which attaches to a local bus and uses an I/O port address selection circuit according to an embodiment of the present invention.

According to an embodiment of the present invention, FIG. 2 shows a block diagram of device 123 which connects to local bus 120. Device 123 includes an automatic I/O port address selection circuit 300 which provides on a bus IO_PORT_ADR binary signals that indicate the base I/O port address of device 123. A Bus Interface Unit (BIU) 210 uses the base I/O port address to identify signals which are on local bus 120 and directed to device 123. In particular, BIU 210 compares addresses sent on local bus 120 to the base I/O port address provided on bus IO_PORT_ADR and determines if a signal is addressed to device 123.

The design of BIU 210 depends on the protocols that must be implemented for local bus 120. Prior art bus interface circuits are well known and compare addresses from a local bus to a fixed address indicated by the setting of switches or jumpers. The address selection circuit 300 can replace the switches or jumper used known bus interface units.

Figure 3:
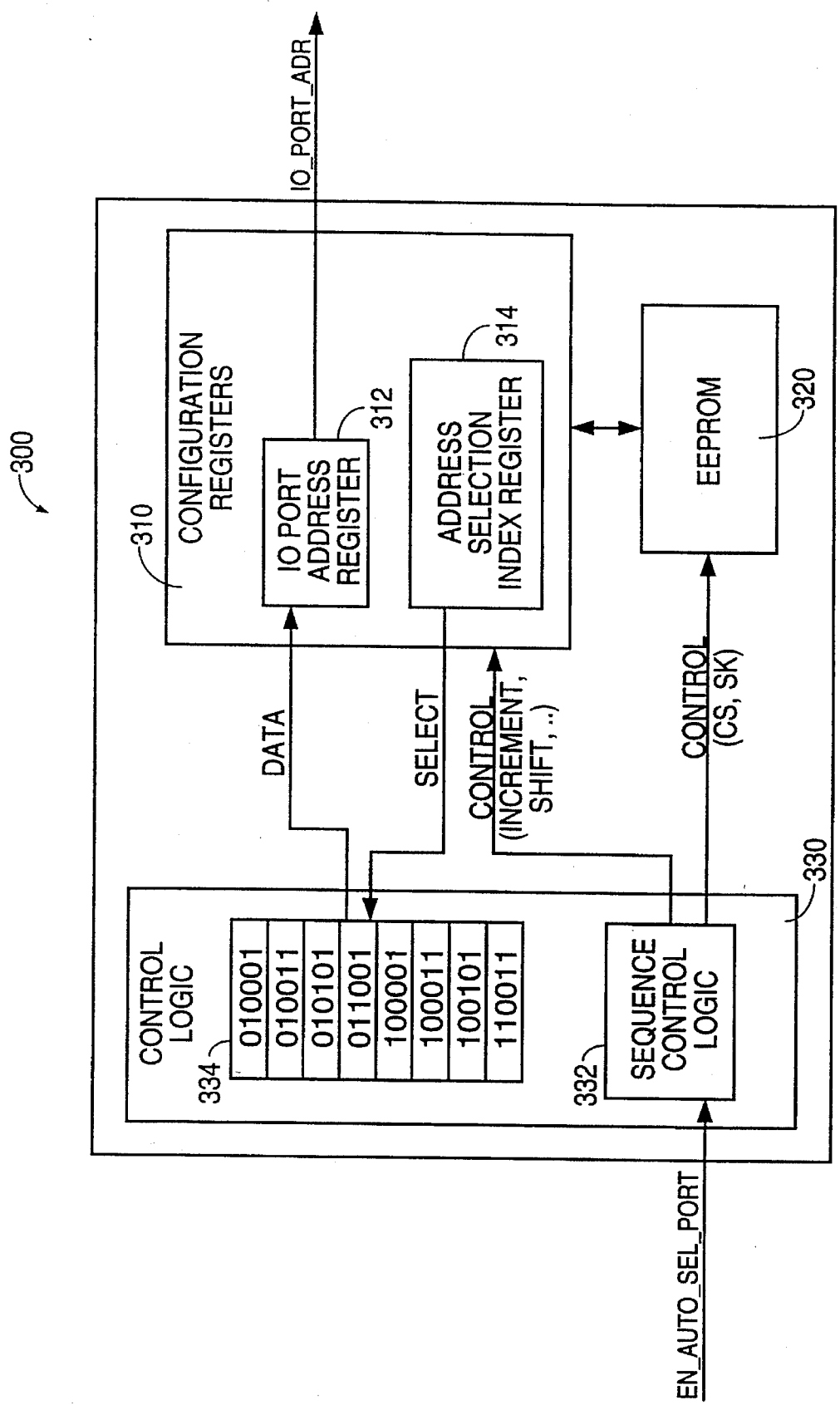
FIG. 3 shows a block diagram of an I/O port address selection circuit according to an embodiment of the present invention.

FIG. 3 shows a block diagram of an I/O port address selection circuit 300 according to an embodiment of the present invention. I/O port address selection circuit 300 contains registers 310 including an I/O port address register 312 and an address selection index register 314. Registers 310 are connected to an ELECTRICALLY ERASABLE-PROGRAMMABLE READ-ONLY MEMORY (EEPROM) 320 and control logic 330. The storage size of registers 310 and EEPROM 320 are as required hold the data described below.

Control logic 330 contains sequence control logic 332 and an address list 334. Sequence control logic 332 can be implemented using random logic, and controls reading from and writing to EEPROM 320, reading from and writing to registers 310, and changing of an index value in address selection index register 314.

Address list 334 is a circuit which when given an index value provides a base I/O port addresses. Such circuits can, for example, be implemented using a ROM containing a list of addresses addressed by the index value or using random logic which implements a function that has the index value as an argument. Address list 334 can be also be implemented in software executed by a processor on the device containing the address selection circuit. Address list 334 may be chosen to provide the I/O port addresses that are most likely to be available and usable for a specific device. In particular, addresses dedicated to other types of device can be avoided.

In FIG. 3, address list 334 provides the only six bits of the base I/O port address. The six bits are sufficient to indicate the base I/O port address for a device on a VESA bus because the remaining bits of the base I/O port address are zero. For a VESA bus, the base I/O port address of a device must be a multiple of sixteen. Generally, only the bits that change from one base I/O port address to the next need to be provided. Constant bit values can be added to form the full base I/O port address if desired.

During initialization, the operation of I/O port address selection circuit 300 depends on a binary signal on line EN_AUTO_SEL_PORT which enables or disables automatic selection c,f a new I/O port address. When automatic selection is disabled, control logic 330 causes an index value from EEPROM 320 to be written into address selection index register 314. Control logic 330 then writes a base address from address list 334 into I/O port address register 312. The index value determines the base I/O port address provided by address list 334. Since EEPROM 320 is non-volatile, the same index value is provided after the device powers down and powers up again. If the address selection circuit 300 remains with the automatic selection disabled, the same base I/O port address continues to be chosen at every initialization.

When automatic selection is enabled, control logic 330 causes the index value from EEPROM 320 to be written into address selection index register 314 then changes the index value. The index value may be incremented or decremented or changed in an almost limitless variety of ways by control logic 330. The changed index value is then written to EEPROM 320 to be used during the next initialization. The changed index value determines the base I/O port address provided by address list 334 and written into I/O port address register 312. Because the index value is changed, the base I/O port address is changed.

In an alternate embodiment, a single configuration register 310 is used for both the index value and the base I/O port address. In still another embodiment, the index value and base I/O port address are identical, and a single configuration register 310 is used. Control logic 330 generates a new I/O port address directly from the old I/O port address. For example, the new I/O port address can be the old I/O port address incremented by the number of bytes between consecutive base I/O port addresses. However, simply incrementing the I/O port address, may set the I/O port address to a value reserved for another type device, and reserved addresses should be avoided.

In addition to resolving I/O port address conflicts, I/O port address selection circuit 300 permits software to change the I/O port address used during a subsequent start-up of a device. A new index value can be written to EEPROM 320. The port address can also be changed immediately by writing a new value to I/O port address register 312. Of course, if EEPROM 320 is on a device that is accessed through a local bus, the device must be accessible before a value can be written by the mother board to EEPROM 320, and software executed by the mother board cannot reliably change a conflicting address.

Referring again to FIG. 2, I/O port address selection circuit 300 may be used as follows. A switch or jumper 230 on device 123 permits a user to enable or disable automatic selection of a I/O port address. Device 123 is normally used with automatic selection disabled.

When device 123 has an address conflict with another device, the host system crashes or does not operate properly. The user resolves the conflict by enabling automatic selection and resetting the system. The base I/O port address changes. If there is no longer a conflict, the system works and the user disables automatic selection. The index value which provides a non-conflicting address is in non-volatile memory, EEPROM 320, therefore the device retains the non-conflicting address. If there is still a conflict after the first reset, resets are repeated until the system works properly, indicating no I/O port address conflict, then automatic address selection is disabled using switch or jumper 230.

Figure 4:
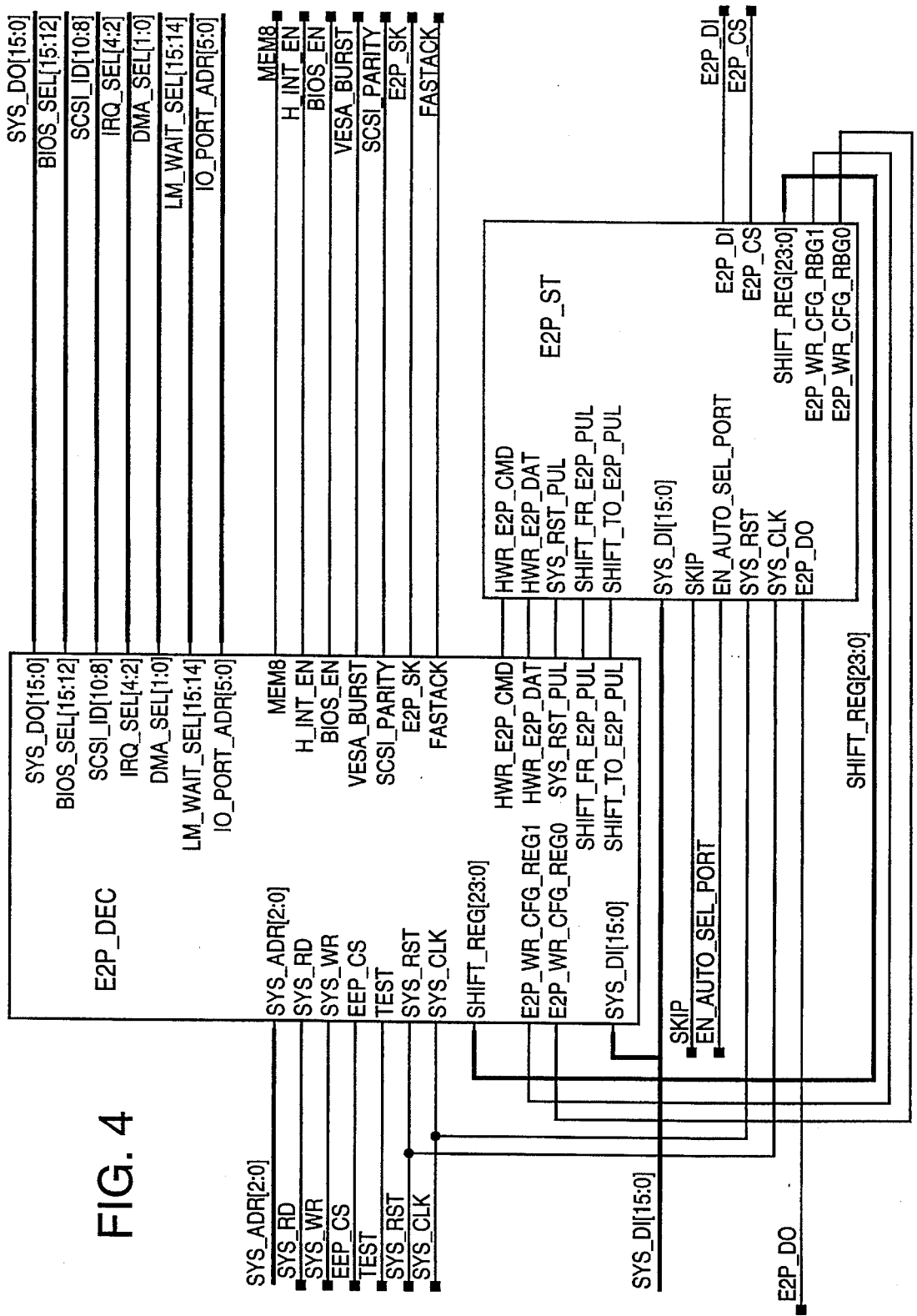
FIG. 4 shows a block diagram of a portion of an I/O port address selection circuit according to a second embodiment of the invention usable with an integrated SCSI controller chip capable of interfacing with a VESA bus.

FIG. 4 shows a block diagram of an I/O port address selection circuit according to another embodiment of the present invention. The embodiment shown in FIG. 4 is for use with a multi-threaded SCSI controller chip with a VESA bus interface as is described in U.S. patent applications entitled "SCSI BUS CONTROLLER WITH STORAGE FOR PERIPHERAL, DEVICE CONFIGURATION DATA" and "INTEGRATED MULTI-THREADED HOST ADAPTER" which were incorporated by reference above.

Blocks E2P_DEC and EP2_ST contain functional elements that perform as described above in regard to FIG. 3. Block EP2_DEC contains configuration registers which provides the I/O port address signal on bus IO_PORT_ADR and contains an address list circuit. The Appendix contains a description of block EP2_DEC in the form of a VHDL program (Very High Level Design Language program). Block E2P_ST contains control logic and a shift register for changing the index value. The Appendix also contains a complete description of block EP2_ST in the form of a VHDL program.

EEPROM for storing the index value is provided on an external chip which is accessed by block E2P_ST through an EEPROM interface. A signal on line EN_AUTO_SEL_PORT enables or disables automatic address selection. A switch or jumper external to the SCSI controller chip may be provided to select the signal on line EN_AUTO_SEL_PORT.

Although the present invention has been described with reference to particular embodiments, the description is only an example of the invention's application and should not be taken as a limitation. The scope of the present invention is defined by the following claims.

Appendix

EEPROM STATE MACHINE DECODER

```
-- file : e2p_dec.vhd
------------------------------------------------------------
--      NM93c06 256 bit serial EEPROM controller Model.
--
-- clock = 1Mhz = 1us
--
-- instruction  sb  op code  address   datain    dataout
--
--    read      1    10      a5-a0               0,d15-d0
--
--    write     1    01      a5-a0     d15-d0    10ms delay busy=0
--
--    ewen      1    00      11xxxx
--
--    ewds      1    00      00xxxx
--
--
------|-----------------------------------------------------
--    |           1111111111 2222222222 3
-- sk |0123456789 0123456789 0123456789 0
------|-----------------------------------------------------
--
--    read
------|-----------------------------------------------------
-- cs |1111111111111111111111111111100000
--    |
--    |     aaaaaa
-- di |_110543210_____
--    |
--    |                   dddddddddddddddd
-- do |zzzzzzzzz0111111                zzzzz
--    |                   5432109876543210
------|-----------------------------------------------------
-- write
------|-----------------------------------------------------
-- cs |11111111111111111111111111111000011111
--    |
--    |     aaaaaadddddddddddddddd
-- di |_1015432101111111_____
--    |         5432109876543210
--    |
-- do |zzzzzzzzzzzzzzzzzzzzzzzzzzzzzz00<>11
--    |
------|-----------------------------------------------------
-- ewen|
------|-----------------------------------------------------
-- cs |1111111111110000
--    |
-- di |_10011xxxx____
--    |
-- do |zzzzzzzzzzzzzz
--    |
------|-----------------------------------------------------
-- ewds|
```

```
-----|--------------------------------------------------
-- cs |1 1 1 1 1 1 1 1 1 1 1 0 0 0 0
--    |
-- di |_1 0 0 0 0 x x x x _ _ _ _
--    |
-- do |z z z z z z z z z z z z z z
--
--
-- e2prom Inputs: e2p_do
--
-- e2prom Outputs: e2p_sk, e2p_cs, e2p_di
--
-- host input : sys_clk, sys_rst, sel_dat, sel_cmd, sys_wr, sys_di
--
-- host output : sys_do
--
--
--
--------------------------------------------------------
-- Interface declaration:

entity e2p_dec is

-- IO ports:

port (
        signal fastack:       out vlbit;
--      signal e2p_cs:        out vlbit; -- eeprom chip select
--      signal e2p_di:        out vlbit; -- eeprom data input
        signal e2p_sk:        out vlbit; -- eeprom clock input
--      signal e2p_do:        in  vlbit; -- eeprom data output
        signal sys_clk:       in  vlbit;
        signal sys_rst:       in  vlbit;
        signal test:          in  vlbit;
        signal eep_cs:        in  vlbit;
        signal sys_adr:       in  vlbit_vector(2 downto 0);
        signal sys_wr:        in  vlbit;
        signal sys_rd:        in  vlbit;
        signal sys_di:        in  vlbit_vector(15 downto 0);
        signal sys_do:        out vlbit_vector(15 downto 0);
--      signal en_auto_sel_port: in vlbit;
        signal bios_sel:      out vlbit_vector(15 downto 12);
        signal scsi_parity:   out vlbit;
        signal scsi_id:       out vlbit_vector(10 downto 8);
        signal vesa_burst:    out vlbit;
        signal bios_en:       out vlbit;
        signal h_int_en:      out vlbit;
        signal irq_sel:       out vlbit_vector(4 downto 2);
        signal dma_sel:       out vlbit_vector(1 downto 0);
        signal lm_wait_sel:   out vlbit_vector(15 downto 14);
        signal mem8:          out vlbit;
        signal io_port_adr:   out vlbit_vector(5 downto 0) ;
```

```
    signal shift_reg:    in vlbit_vector(23 downto 0);
    signal e2p_wr_cfg_reg0: in vlbit;
    signal e2p_wr_cfg_reg1: in vlbit;

signal shift_to_e2p_pul:  out  vlbit;
    signal shift_fr_e2p_pul:  out  vlbit;
    signal sys_rst_pul:    out vlbit;
    signal hwr_e2p_dat:    out vlbit;
    signal hwr_e2p_cmd:    out vlbit
         );
end e2p_dec;
```

---

-- Architecture body:

architecture STATE_MACHINE1 of e2p_dec is

```
--  signal e2p_proc:  vlbit ;
    signal q:       vlbit_vector(5 downto 0) ;
    signal cfg_reg0:  vlbit_vector(15 downto 0);
    signal cfg_reg1:  vlbit_vector(15 downto 0);
--  signal send_cmd, rd_wr_data:  vlbit;
--  signal send_cmd_proc, rd_wr_data_proc: vlbit;
    signal e2p_wr_cfg_reg0_clkh, e2p_wr_cfg_reg1_clkh:     vlbit;
    signal e2p_wr_cfg_reg0_clkl, e2p_wr_cfg_reg1_clkl:     vlbit;
--  signal init_start_proc:     vlbit;
    signal res_7 : vlbit_1d(6 downto 0);
    signal ff_q : vlbit_1d(2 downto 0);
--  signal rd_cmd, wr_cmd, ew_en_ds :   vlbit;
    signal hi_clk: vlbit;
--  signal init_io_port:  out vlbit_vector(5 downto 0);
--  signal io_port_add1:  inout vlbit_1d(3 downto 0);

--  signal shift_st       : vlbit_vector(2 downto 0);
--  signal auto_sel_port_st : vlbit_vector(3 downto 0);
--  signal cycle_st       : vlbit_vector(4 downto 0);
--  signal set_e2p_proc   : vlbit_vector(1 downto 0);

signal hwr_cfg_reg0:   vlbit;
    signal hwr_cfg_reg1:   vlbit;
    signal hrd_id0  :   vlbit;
    signal hrd_id1  :   vlbit;
    signal hrd_cfg_reg0:   vlbit;
    signal hrd_rev  :   vlbit;
    signal hrd_cfg_reg1:   vlbit;
    signal hrd_e2p_dat:    vlbit;
    signal hrd_e2p_cmd:    vlbit;

begin
```

--- decode : block

```
begin
    hwr_cfg_reg0 <= eep_cs and sys_wr and not sys_adr(2) and     sys_adr(1) and not sys_adr(0); --base+2
    hwr_cfg_reg1 <= eep_cs and sys_wr and     sys_adr(2) and not sys_adr(1) and not sys_adr(0); --base+4
    hwr_e2p_dat  <= eep_cs and sys_wr and     sys_adr(2) and     sys_adr(1) and not sys_adr(0); --base+6
    hwr_e2p_cmd  <= eep_cs and sys_wr and     sys_adr(2) and     sys_adr(1) and     sys_adr(0); --base+7
    hrd_id0      <= eep_cs and sys_rd and not sys_adr(2) and not sys_adr(1) and not sys_adr(0); --base+0
    hrd_id1      <= eep_cs and sys_rd and not sys_adr(2) and not sys_adr(1) and     sys_adr(0); --base+1
    hrd_cfg_reg0 <= eep_cs and sys_rd and not sys_adr(2) and     sys_adr(1) and not sys_adr(0); --base+2
    hrd_rev      <= eep_cs and sys_rd and not sys_adr(2) and     sys_adr(1) and     sys_adr(0); --base+3
    hrd_cfg_reg1 <= eep_cs and sys_rd and     sys_adr(2) and not sys_adr(1)                    ; --base+4
    hrd_e2p_dat  <= eep_cs and sys_rd and     sys_adr(2) and     sys_adr(1) and not sys_adr(0); --base+6
    hrd_e2p_cmd  <= eep_cs and sys_rd and     sys_adr(2) and     sys_adr(1) and     sys_adr(0); --base+7

--   e2p_sk <= q(5);
--   shift_to_e2p_pul <= (not q(0)) and (not q(1)) and (not q(2)) and (not q(3)) and (not q(4)) and (not q(5));
--   shift_fr_e2p_pul <= (not q(0)) and (not q(1)) and (not q(2)) and (not q(3)) and (not q(4)) and q(5);
    e2p_sk <= (((q(5) and not hi_clk) or (q(4) and hi_clk)) and not test) or (q(2) and test);
    shift_to_e2p_pul <= ((not q(0)) and (not q(1)) and (not q(2)) and (not q(3)) and (not q(4)) and (not q(5)) and not hi_clk and not test) or
              ((not q(0)) and (not q(1)) and (not q(2)) and (not q(3)) and (not q(4))                    and hi_clk and not test) or
              ((not q(0)) and (not q(1)) and (not q(2))                                                  and test);
    shift_fr_e2p_pul <= ((not q(0)) and (not q(1)) and (not q(2)) and (not q(3)) and (not q(4)) and    q(5) and not hi_clk and not test) or
              ((not q(0)) and (not q(1)) and (not q(2)) and (not q(3)) and (not q(4))                    and hi_clk and not test) or
              ((not q(0)) and (not q(1)) and    q(2)                                                     and test);

-- system read registers
    sys_do(15 downto 8) <= b"00000100"        when hrd_id0     ='1' else
              b"00100101"        when hrd_id1     ='1' else
              cfg_reg0(15 downto 8) when hrd_cfg_reg0 ='1' else
                     b"00000001"        when hrd_rev = '1'    else
              cfg_reg1(15 downto 8) when hrd_cfg_reg1 ='1' else
              shift_reg(15 downto 8) when hrd_e2p_dat ='1' else
              shift_reg(23 downto 16) when hrd_e2p_cmd ='1' else
              b"ZZZZZZZZ";
    sys_do(7 downto 0) <= b"11000001"        when hrd_id0     ='1' or
                                          hrd_id1     ='1' else
              cfg_reg0(7 downto 0) when hrd_cfg_reg0 ='1' or
                       hrd_rev     ='1' else
              cfg_reg1(7 downto 0) when hrd_cfg_reg1 ='1' else
              shift_reg(7 downto 0) when hrd_e2p_dat ='1' or
                       hrd_e2p_cmd ='1' else
              b"ZZZZZZZZ";

--   e2p_di <= dat_to_e2p and e2p_cs_src;
--   e2p_cs <= e2p_cs_src;
    sys_rst_pul <= not ff_q(0) and ff_q(2);
```

```
    res_7 <= addum(q, '0' & b"1");
e2p_wr_cfg_reg0_clkh <= e2p_wr_cfg_reg0 and not sys_clk;
e2p_wr_cfg_reg0_clkl <= e2p_wr_cfg_reg0 and not sys_clk;
e2p_wr_cfg_reg1_clkh <= e2p_wr_cfg_reg1 and not sys_clk;
e2p_wr_cfg_reg1_clkl <= e2p_wr_cfg_reg1 and not sys_clk;

end block decode;

------------------------------------------------------------- config_output : block
  begin
  bios_sel    <= cfg_reg0(15 downto 12);
  scsi_parity <= cfg_reg0(11);
  scsi_id     <= cfg_reg0(10 downto 8);
  vesa_burst  <= cfg_reg0(7);
  bios_en     <= cfg_reg0(6);
  h_int_en    <= cfg_reg0(5);
  irq_sel     <= cfg_reg0(4 downto 2);
  dma_sel     <= cfg_reg0(1 downto 0);

lm_wait_sel <= cfg_reg1(15 downto 14);
-- ff_thres_sel <= cfg_reg1(13 downto 12);
  hi_clk   <= cfg_reg1(13);
  fastack  <= cfg_reg1(12);
  mem8     <= cfg_reg1(11);
-- io_port_sel <= cfg_reg1(10 downto 8);
-- tout_sel    <= cfg_reg1(7 downto 6);
  io_port_adr <= cfg_reg1(5 downto 0);

end block config_output;

------------------------------------------------------------- sys_rst_pulse: process
  begin
    wait until (sys_clk='1' and sys_clk'event);
    if sys_rst ='1' then
      ff_q(0) <= '1';
    else
      ff_q(0) <= '0';
    end if;
    ff_q(1) <= ff_q(0);
    ff_q(2) <= ff_q(1);
end process sys_rst_pulse;

------------------------------------------------------------- div16_clock: process
  begin
    wait until (sys_clk='1' and sys_clk'event);
    if sys_rst ='1' then
      q <= b"000000";
    else
      q <= res_7(5 downto 0);
```

```
        end if;
    end process div16_clock;

--------------------------------------------------------------- wr_cfg_reg0h : process
  begin
    wait until ((e2p_wr_cfg_reg0_clkh ='1' and e2p_wr_cfg_reg0_clkh'event)
          or sys_rst = '1' or hwr_cfg_reg0 = '1');

if sys_rst = '1' then              -----***** temporary added
      cfg_reg0(15 downto 8) <= x"7f";         -----***** temporary added
    elsif hwr_cfg_reg0 ='1' then
      cfg_reg0(15 downto 8) <= sys_di(15 downto 8);
    else
      cfg_reg0(15 downto 8) <= shift_reg(15 downto 8);
    end if;
end process wr_cfg_reg0h;

wr_cfg_reg0l : process
  begin
    wait until ((e2p_wr_cfg_reg0_clkl ='1' and e2p_wr_cfg_reg0_clkl'event)
          or sys_rst = '1' or hwr_cfg_reg0 = '1');

if sys_rst = '1' then              -----***** temporary added
      cfg_reg0(7 downto 0) <= x"2d";          -----***** temporary added
    elsif hwr_cfg_reg0 ='1' then
      cfg_reg0(7 downto 0) <= sys_di(7 downto 0);
    else
      cfg_reg0(7 downto 0) <= shift_reg(7 downto 0);
    end if;
end process wr_cfg_reg0l;

--------------------------------------------------------------- wr_cfg_reg1h : process
  begin
    wait until ((e2p_wr_cfg_reg1_clkh='1' and e2p_wr_cfg_reg1_clkh'event)
          or sys_rst = '1' or hwr_cfg_reg1 = '1');

if sys_rst = '1' then              -----***** temporary added
      cfg_reg1(15 downto 8) <= x"c7";         -----***** temporary added
    elsif hwr_cfg_reg1 ='1' then
      cfg_reg1(15 downto 8) <= sys_di(15 downto 8);
    else
      cfg_reg1(15 downto 8) <= shift_reg(15 downto 8);
    end if;

end process wr_cfg_reg1h;

wr_cfg_reg1l : process
  begin
    wait until ((e2p_wr_cfg_reg1_clkl='1' and e2p_wr_cfg_reg1_clkl'event)
          or sys_rst = '1' or hwr_cfg_reg1 = '1');
```

```
    if sys_rst = '1' then              -----*****  temporary added
      cfg_reg1(7 downto 0) <= x"33";   -----*****  temporary added
    elsif hwr_cfg_reg1 ='1' then
      cfg_reg1(7 downto 0) <= sys_di(7 downto 0);
    else
      cfg_reg1(7 downto 0) <= shift_reg(7 downto 0);
    end if;

end process wr_cfg_reg11;
```

---

```
end STATE_MACHINE1;
```

EEPROM
STATE MACHINE

```
-- file : e2p_st.vhd
------------------------------------------------------------
--       NM93c06 256 bit serial EEPROM controller Model.
--
-- clock = 1Mhz = 1us
--
-- instruction  sb  op code  address  datain  dataout
--
--    read      1    10      a5-a0            0,d15-d0
--
--    write     1    01      a5-a0    d15-d0  10ms delay busy=0
--
--    ewen      1    00      11xxxx
--
--    ewds      1    00      00xxxx
--
--
------|------------------------------------------------------
--    |                1 1 1 1 1 1 1 1 1 1 2 2 2 2 2 2 2 2 2 2 3
-- sk |0 1 2 3 4 5 6 7 8 9 0 1 2 3 4 5 6 7 8 9 0 1 2 3 4 5 6 7 8 9 0
------|------------------------------------------------------
--
--   read
------|------------------------------------------------------
-- cs |1 1 1 1 1 1 1 1 1 1 1 1 1 1 1 1 1 1 1 1 1 1 1 1 1 1 0 0 0 0 0
--    |
--    |           a a a a a a
-- di |_1 1 0 5 4 3 2 1 0_____
--    |
--    |                     d d d d d d d d d d d d d d d d
-- do |z z z z z z z z 0 1 1 1 1 1 1              z z z z z
--    |                1 1 1 1 1 1 1 1 1
--    |                5 4 3 2 1 0 9 8 7 6 5 4 3 2 1 0
------|------------------------------------------------------
-- write
------|------------------------------------------------------
-- cs |1 1 1 1 1 1 1 1 1 1 1 1 1 1 1 1 1 1 1 1 1 1 1 1 1 0 0 0 0 1 1 1 1 1
--    |
--    |           a a a a a a d d d d d d d d d d d d d d d d
-- di |_1 0 1 5 4 3 2 1 0 1 1 1 1 1 1 1
--    |                     5 4 3 2 1 0 9 8 7 6 5 4 3 2 1 0
--    |
-- do |z z z z z z z z z z z z z z z z z z z z z z z z z z 0 0 <> 1 1
--    |
------|------------------------------------------------------
-- ewen|
------|------------------------------------------------------
-- cs |1 1 1 1 1 1 1 1 1 1 1 0 0 0 0
--    |
-- di |_1 0 0 1 1 x x x x____
--    |
-- do |z z z z z z z z z z z z z
--    |
------|------------------------------------------------------
-- ewds|
```

```
--          |
-- cs       |1 1 1 1 1 1 1 1 1 1 0 0 0 0
--          |
-- di       |_ 1 0 0 0 0 x x x x _ _ _ _
--          |
-- do       |z z z z z z z z z z z z z z
--
--
-- e2prom Inputs: e2p_do
--
-- e2prom Outputs: e2p_sk, e2p_cs, e2p_di
--
-- host input : sys_clk, sys_rst, sel_dat, sel_cmd, sys_wr, sys_di
--
-- host output : sys_do
--
--
--
-------------------------------------------------------------------
-- Interface declaration:

entity e2p_st is

-- IO ports:

port (
--      signal fastack:         out vlbit;
        signal e2p_cs:          out vlbit;  -- eeprom chip select
        signal e2p_di:          out vlbit;  -- eeprom data input
--      signal e2p_sk:          out vlbit;  -- eeprom clock input
        signal e2p_do:          in  vlbit;  -- eeprom data output
        signal sys_clk:         in  vlbit;
        signal sys_rst:         in  vlbit;
        signal skip:            in  vlbit;
--      signal test:            in  vlbit;
--      signal eep_cs:          in  vlbit;
--      signal sys_adr:         in  vlbit_vector(2 downto 0);
--      signal sys_wr:          in  vlbit;
--      signal sys_rd:          in  vlbit;
        signal sys_di:          in  vlbit_vector(15 downto 0);
--      signal sys_do:          out vlbit_vector(15 downto 0);
        signal en_auto_sel_port: in vlbit;
--      signal bios_sel:        out vlbit_vector(15 downto 12);
--      signal scsi_parity:     out vlbit;
--      signal scsi_id:         out vlbit_vector(10 downto 8);
--      signal vesa_burst:      out vlbit;
--      signal floppy_en:       out vlbit;
--      signal h_int_en:        out vlbit;
--      signal irq_sel:         out vlbit_vector(4 downto 2);
--      signal dma_sel:         out vlbit_vector(1 downto 0);
--      signal lm_wait_sel:     out vlbit_vector(15 downto 14);
--      signal mem8:            out vlbit;
--      signal io_port_adr:     out vlbit_vector(5 downto 0)
```

```
    signal shift_to_e2p_pul:  in vlbit;
    signal shift_fr_e2p_pul:  iin vlbit;
    signal sys_rst_pul:       in vlbit;
    signal hwr_e2p_dat:       in vlbit;
    signal hwr_e2p_cmd:       in vlbit;

signal shift_reg:       inout vlbit_vector(23 downto 0) ;
    signal e2p_wr_cfg_reg0: out vlbit;
    signal e2p_wr_cfg_reg1: out vlbit
         );
end e2p_st;
```

---

-- Architecture body:

architecture STATE_MACHINE1 of e2p_st is

```
    signal e2p_proc:  vlbit ;
--  signal q:         vlbit_vector(5 downto 0) ;
--  signal cfg_reg0:  vlbit_vector(15 downto 0);
--  signal cfg_reg1:  vlbit_vector(15 downto 0);
    signal send_cmd, rd_wr_data:  vlbit;
    signal send_cmd_proc, rd_wr_data_proc: vlbit;
--  signal e2p_wr_cfg_reg0, e2p_wr_cfg_reg1:       vlbit;
--  signal e2p_wr_cfg_reg0_clk, e2p_wr_cfg_reg1_clk:    vlbit;
    signal init_start_proc:  vlbit;
    signal dat_to_e2p:       vlbit;
    signal e2p_cs_src:       vlbit;
--  signal res_7 : vlbit_1d(6 downto 0);
--  signal ff_q  : vlbit_1d(2 downto 0);
    signal rd_cmd, wr_cmd, ew_en_ds :  vlbit;
--  signal hi_clk: vlbit;
    signal init_io_port:   vlbit_vector(5 downto 0);
    signal io_port_add1:   vlbit_1d(3 downto 0);

signal shift_st         : vlbit_vector(2 downto 0);
    signal auto_sel_port_st : vlbit_vector(3 downto 0);
    signal cycle_st         : vlbit_vector(4 downto 0);
    signal set_e2p_proc     : vlbit_vector(1 downto 0);

--  signal hwr_cfg_reg0:  vlbit;
--  signal hwr_cfg_reg1:  vlbit;
--  signal hrd_id0   :    vlbit;
--  signal hrd_id1   :    vlbit;
--  signal hrd_cfg_reg0:  vlbit;
--  signal hrd_rev   :    vlbit;
--  signal hrd_cfg_reg1:  vlbit;
--  signal hrd_e2p_dat:   vlbit;
--  signal hrd_e2p_cmd:   vlbit;

constant ss0 : integer := 0;
```

```
constant ss1 : integer := 1;
constant ss2 : integer := 2;
constant ss3 : integer := 3;
constant ss4 : integer := 4;
constant ss5 : integer := 5;
constant ss6 : integer := 6;

constant as0 : integer := 0;
constant as1 : integer := 1;
constant as2 : integer := 2;
constant as3 : integer := 3;
constant as4 : integer := 4;
constant as5 : integer := 5;
constant as6 : integer := 6;
constant as7 : integer := 7;
constant as8 : integer := 8;
constant as9 : integer := 9;
constant as10: integer := 10;
constant as11: integer := 11;
constant as12: integer := 12;

constant cs0 : integer := 0;
constant cs1 : integer := 1;
constant cs2 : integer := 2;
constant cs3 : integer := 3;
constant cs4 : integer := 4;
constant cs5 : integer := 5;
constant cs6 : integer := 6;
constant cs7 : integer := 7;
constant cs8 : integer := 8;
constant cs9 : integer := 9;
constant cs10: integer := 10;
constant cs11: integer := 11;
constant cs12: integer := 12;
constant cs13: integer := 13;
constant cs14: integer := 14;
constant cs15: integer := 15;
constant cs16: integer := 16;
constant cs17: integer := 17;

constant proc_s0 : integer := 0;
constant proc_s1 : integer := 1;
constant proc_s2 : integer := 2;
constant proc_s3 : integer := 3;

constant ss0v: vlbit_vector(2 downto 0) := b"000";
constant ss1v: vlbit_vector(2 downto 0) := b"001";
constant ss2v: vlbit_vector(2 downto 0) := b"010";
constant ss3v: vlbit_vector(2 downto 0) := b"011";
constant ss4v: vlbit_vector(2 downto 0) := b"100";
constant ss5v: vlbit_vector(2 downto 0) := b"101";
constant ss6v: vlbit_vector(2 downto 0) := b"110";

constant as0v : vlbit_vector(3 downto 0) := b"0000";
```

```
constant as1v : vlbit_vector(3 downto 0) := b"0001";
constant as2v : vlbit_vector(3 downto 0) := b"0010";
constant as3v : vlbit_vector(3 downto 0) := b"0011";
constant as4v : vlbit_vector(3 downto 0) := b"0100";
constant as5v : vlbit_vector(3 downto 0) := b"0101";
constant as6v : vlbit_vector(3 downto 0) := b"0110";
constant as7v : vlbit_vector(3 downto 0) := b"0111";
constant as8v : vlbit_vector(3 downto 0) := b"1000";
constant as9v : vlbit_vector(3 downto 0) := b"1001";
constant as10v: vlbit_vector(3 downto 0) := b"1010";
constant as11v: vlbit_vector(3 downto 0) := b"1011";
constant as12v: vlbit_vector(3 downto 0) := b"1100";

constant cs0v : vlbit_vector(4 downto 0) := b"00000";
constant cs1v : vlbit_vector(4 downto 0) := b"00001";
constant cs2v : vlbit_vector(4 downto 0) := b"00010";
constant cs3v : vlbit_vector(4 downto 0) := b"00011";
constant cs4v : vlbit_vector(4 downto 0) := b"00100";
constant cs5v : vlbit_vector(4 downto 0) := b"00101";
constant cs6v : vlbit_vector(4 downto 0) := b"00110";
constant cs7v : vlbit_vector(4 downto 0) := b"00111";
constant cs8v : vlbit_vector(4 downto 0) := b"01000";
constant cs9v : vlbit_vector(4 downto 0) := b"01001";
constant cs10v: vlbit_vector(4 downto 0) := b"01010";
constant cs11v: vlbit_vector(4 downto 0) := b"01011";
constant cs12v: vlbit_vector(4 downto 0) := b"01100";
constant cs13v: vlbit_vector(4 downto 0) := b"01101";
constant cs14v: vlbit_vector(4 downto 0) := b"01110";
constant cs15v: vlbit_vector(4 downto 0) := b"01111";
constant cs16v: vlbit_vector(4 downto 0) := b"10000";
constant cs17v: vlbit_vector(4 downto 0) := b"10001";

constant proc_s0v: vlbit_vector(1 downto 0) := b"00";
constant proc_s1v: vlbit_vector(1 downto 0) := b"01";
constant proc_s2v: vlbit_vector(1 downto 0) := b"10";
constant proc_s3v: vlbit_vector(1 downto 0) := b"11";

constant sel_port0: integer := 0;
constant sel_port1: integer := 1;
constant sel_port2: integer := 2;
constant sel_port3: integer := 3;
constant sel_port4: integer := 4;
constant sel_port5: integer := 5;
constant sel_port6: integer := 6;
--  constant sel_port7: integer := 7;

constant set_port0: vlbit_vector(5 downto 0) := b"010001";   -- base address 110h
constant set_port1: vlbit_vector(5 downto 0) := b"010011";   -- base address 130h
constant set_port2: vlbit_vector(5 downto 0) := b"010101";   -- base address 150h
constant set_port3: vlbit_vector(5 downto 0) := b"011001";   -- base address 190h
constant set_port4: vlbit_vector(5 downto 0) := b"100001";   -- base address 210h
constant set_port5: vlbit_vector(5 downto 0) := b"100011";   -- base address 230h
constant set_port6: vlbit_vector(5 downto 0) := b"100101";   -- base address 250h
```

```
          constant set_port7: vlbit_vector(5 downto 0) := b"110011";    -- base address 330h
        begin io_port : block
          begin
            with vld2int(io_port_add1(2 downto 0)) select
              init_io_port <= set_port0   when sel_port0,
                              set_port1   when sel_port1,
                              set_port2   when sel_port2,
                              set_port3   when sel_port3,
                              set_port4   when sel_port4,
                              set_port5   when sel_port5,
                              set_port6   when sel_port6,
--                            set_port7   when sel_port7,
                              set_port7   when others;

io_port_add1 <= addum(shift_reg(10 downto 8), b"001");
            e2p_di <= dat_to_e2p and e2p_cs_src;
            e2p_cs <= e2p_cs_src;
          end block;
------------------------------------------------------------------------
          process_e2prom_cmd : process begin
            wait until (sys_clk='1' and sys_clk'event) or sys_rst='1';
            if sys_rst ='1' then
              shift_st <= ss0v;
              auto_sel_port_st <= as0v;
              init_start_proc <= '0';
              e2p_wr_cfg_reg0 <= '0';
              e2p_wr_cfg_reg1 <= '0';
              e2p_cs_src <= '0';
              dat_to_e2p <= '0';
              send_cmd <= '0';
              rd_wr_data <= '0';
              rd_cmd    <= '0';
              wr_cmd    <= '0';
              ew_en_ds  <='0';
            else -- host_wr_rd_reg
              if hwr_e2p_cmd ='1' then
                shift_reg(23 downto 16) <= sys_di(15 downto 8);
              elsif hwr_e2p_dat ='1' then
                shift_reg(15 downto 0) <= sys_di;
              end if;

case integer(auto_sel_port_st) is
                when as0 =>
                  if sys_rst_pul = '1' then
                    auto_sel_port_st <= as1v;
                  end if;
```

```
    when as1 =>
      if sys_rst_pul = '1' and skip = '0' then
--*****temporary disable auto_start      if sys_rst_pul = '1' then
--******* if sys_rst_pul = '0' then
        shift_reg(23 downto 16) <= x"80";
        init_start_proc <= '1';
        auto_sel_port_st <= as2v;
      else
        auto_sel_port_st <= as0v;
      end if;
    when as2 =>
      if e2p_proc = '1' and e2p_cs_src ='1' then
        init_start_proc <= '0';
        auto_sel_port_st <= as3v;
      end if;
    when as3 =>
      if e2p_cs_src = '0' then
        e2p_wr_cfg_reg0 <= '1';
        auto_sel_port_st <= as4v;
      end if;
    when as4 =>
        e2p_wr_cfg_reg0 <= '0';
        shift_reg(23 downto 16) <= x"81";
        init_start_proc <= '1';
        auto_sel_port_st <= as5v;
    when as5 =>
      if e2p_proc = '1' and e2p_cs_src='1' then
        init_start_proc <= '0';
        auto_sel_port_st <= as6v;
      end if;
    when as6 =>
      if e2p_cs_src = '0' then
        if en_auto_sel_port ='0' then
          e2p_wr_cfg_reg1 <= '1';
        else                        --need try new io port
            shift_reg(10 downto 8) <= io_port_add1(2 downto 0);
            shift_reg(5 downto 0)  <= init_io_port;
          end if;
        auto_sel_port_st <= as7v;
      end if;
    when as7 =>
      if en_auto_sel_port ='0' then    --configuation been set
        e2p_wr_cfg_reg1 <= '0';
        auto_sel_port_st <= as0v;
      else                         --configuration not been set
        e2p_wr_cfg_reg1 <= '1';
        auto_sel_port_st <= as8v;
      end if;
    when as8 =>
      e2p_wr_cfg_reg1 <= '0';
      shift_reg(23 downto 16) <= x"30"; -- enable write and erase
      init_start_proc <= '1';
      auto_sel_port_st <= as9v;
    when as9 =>
```

```
      if e2p_proc = '1' and e2p_cs_src ='1' then
        init_start_proc <= '0';
        auto_sel_port_st <= as10v;
      end if;
    when as10 =>
      if e2p_cs_src = '0' then
        shift_reg(23 downto 16) <= x"41";
        init_start_proc <= '1';
        auto_sel_port_st <= as11v;
      end if;
    when as11 =>
      if e2p_proc = '1' and e2p_cs_src ='1' then
        init_start_proc <= '0';
        auto_sel_port_st <= as12v;
      end if;
    when as12 =>
      if e2p_cs_src = '0' then
        auto_sel_port_st <= as0v;
      end if;

when others =>
      auto_sel_port_st <= b"XXXX";
  end case;

---------------------------------------------------------------- case integer(shift_st) is
    when ss0 =>
      if e2p_proc ='1' and shift_to_e2p_pul = '1' then
        shift_st <= ss1v;
        e2p_cs_src <= '1';
        dat_to_e2p <= '0';
        send_cmd <= '1';
      end if;
    when ss1 =>
      if shift_to_e2p_pul = '1' then
        dat_to_e2p <= '1';
        shift_st <= ss2v;
        if shift_reg(23)='1' and shift_reg(22)='0' then
          rd_cmd    <= '1';
        elsif shift_reg(23)='0' and shift_reg(22)='1' then
          wr_cmd    <= '1';
        elsif shift_reg(23)='0' and shift_reg(22)='0' then
          ew_en_ds  <= '1';
        end if;
        send_cmd <= '0';
        if (shift_reg(23)='1' and shift_reg(22)='0') or (shift_reg(23)='0' and shift_reg(22)='1') then
          if rd_cmd ='1'or wr_cmd = '1' then
            rd_wr_data <= '1';
          end if;
        end if;
      end if;
    when ss2 =>
      if shift_to_e2p_pul = '1' then
        dat_to_e2p <= shift_reg(23);
```

```
            shift_reg(23 downto 17) <= shift_reg(22 downto 16);
            shift_reg(16) <= shift_reg(23);
         if send_cmd_proc = '0' then
            if ew_en_ds ='1' then
              dat_to_e2p <= '0';
              shift_st <= ss6v;
                else
              shift_st <= ss3v;
            end if;
              else
            shift_st <= ss2v;
         end if;
      end if;
    when ss3 =>
--       if shift_fr_e2p_pul = '1' and rd_cmd = '1' and e2p_do ='1' then
--           putline ("Invalid EEPROM serial input data");
--           rd_wr_data <= '0';
--           shift_st <= ss6v;
--        elsif shift_to_e2p_pul = '1' then
         if shift_to_e2p_pul = '1'  then
            shift_st <= ss4v;
            if rd_cmd ='1' then
              dat_to_e2p <= '0';
            else
              shift_reg(0) <= shift_reg(15);
              dat_to_e2p <= shift_reg(15);
              shift_reg(15 downto 1) <= shift_reg(14 downto 0);
            end if;
         end if;
    when ss4 =>
       if shift_fr_e2p_pul = '1' and rd_cmd = '1' then
            shift_reg(0) <= e2p_do;
            shift_reg(15 downto 1) <= shift_reg(14 downto 0);
         if rd_wr_data_proc = '0' then
            shift_st <= ss5v;
         end if;
       elsif shift_to_e2p_pul = '1' and wr_cmd = '1' then
            shift_reg(0) <= shift_reg(15);
            dat_to_e2p <= shift_reg(15);
            shift_reg(15 downto 1) <= shift_reg(14 downto 0);
         if rd_wr_data_proc = '0' then
            shift_st <= ss5v;
         end if;
            else
          shift_st <= ss4v;
       end if;
    when ss5 =>
          rd_wr_data <= '0';
       if shift_fr_e2p_pul = '1' and rd_cmd = '1' then
          shift_reg(0) <= e2p_do;
          shift_st <= ss6v;
          shift_reg(15 downto 1) <= shift_reg(14 downto 0);
       elsif shift_to_e2p_pul = '1' and wr_cmd ='1' then
          e2p_cs_src   <= '0';
```

```
            wr_cmd    <= '0';
            dat_to_e2p <= '0';
            shift_st <= ss0v;
              else
            shift_st <= ss5v;
          end if;
       when ss6 =>
          if shift_to_e2p_pul = '1' then
            dat_to_e2p <= '0';
            rd_cmd    <= '0';
            ew_en_ds  <= '0';
            e2p_cs_src   <= '0';
            shift_st <= ss0v;
              end if;
       when others =>
          shift_st <= b"XXX";
       end case;
     end if;
  end process process_e2prom_cmd;

--------------------------------------------------------------- cycle_process : process
    begin
      wait until (sys_clk='1' and sys_clk'event) or sys_rst='1';
      if sys_rst ='1' then
        cycle_st <= cs0v;
        send_cmd_proc <= '0';
        rd_wr_data_proc <= '0';
      else
      case integer(cycle_st) is
        when cs0 =>
          if send_cmd = '1' then
            send_cmd_proc <= '1';
            cycle_st <= cs1v;
          elsif rd_wr_data = '1' then
            rd_wr_data_proc <= '1';
            cycle_st <= cs1v;
          end if;
        when cs1 =>
        if shift_to_e2p_pul = '1' then
           cycle_st <= cs2v;
        end if;
        when cs2 =>
        if shift_to_e2p_pul = '1' then
           cycle_st <= cs3v;
        end if;
        when cs3 =>
        if shift_to_e2p_pul = '1' then
           cycle_st <= cs4v;
        end if;
        when cs4 =>
        if shift_to_e2p_pul = '1' then
           cycle_st <= cs5v;
```

```
end if;
when cs5 =>
if shift_to_e2p_pul = '1' then
   cycle_st <= cs6v;
end if;
when cs6 =>
if shift_to_e2p_pul = '1' then
   cycle_st <= cs7v;
end if;
when cs7 =>
if shift_to_e2p_pul = '1' then
   cycle_st <= cs8v;
end if;
when cs8 =>
if shift_to_e2p_pul = '1' then
  if send_cmd_proc = '1' then
    send_cmd_proc <= '0';
    cycle_st <= cs0v;
   else
    cycle_st <= cs9v;
   end if;
end if;
when cs9 =>
if shift_to_e2p_pul = '1' then
   cycle_st <= cs10v;
end if;
when cs10 =>
if shift_to_e2p_pul = '1' then
   cycle_st <= cs11v;
end if;
when cs11 =>
if shift_to_e2p_pul = '1' then
   cycle_st <= cs12v;
end if;
when cs12 =>
if shift_to_e2p_pul = '1' then
   cycle_st <= cs13v;
end if;
when cs13 =>
if shift_to_e2p_pul = '1' then
   cycle_st <= cs14v;
end if;
when cs14 =>
if shift_to_e2p_pul = '1' then
   cycle_st <= cs15v;
end if;
when cs15 =>
if shift_to_e2p_pul = '1' then
   cycle_st <= cs16v;
end if;
when cs16 =>
if shift_to_e2p_pul = '1' then
   rd_wr_data_proc <= '0';
   cycle_st <= cs17v;
```

```
      end if;
    when cs17 =>
     if shift_to_e2p_pul = '1' then
      if rd_wr_data ='0' then
        cycle_st <= cs0v;
      end if;
     end if;
     when others =>
        cycle_st <= b"XXXXX";
   end case;

end if;
 end process cycle_process;
```

---

```
set_e2prom_proc : process
  begin
   wait until (sys_clk='1' and sys_clk'event);
   if sys_rst ='1' then
      e2p_proc <= '0';
      set_e2p_proc <= proc_s0v;
   else
     case integer(set_e2p_proc) is
       when proc_s0 =>
         if hwr_e2p_cmd ='1' then
            set_e2p_proc <= proc_s1v;
         elsif init_start_proc = '1' then
            e2p_proc <= '1';
            set_e2p_proc <= proc_s3v;
         end if;
       when proc_s1 =>
         if hwr_e2p_cmd = '0' then
            e2p_proc <= '1';
            set_e2p_proc <= proc_s2v;
         end if;
       when proc_s2 =>
         if e2p_cs_src = '1' then
            e2p_proc <= '0';
            set_e2p_proc <= proc_s0v;
         end if;
       when proc_s3 =>
         if e2p_cs_src = '1' and init_start_proc = '0' then
            e2p_proc <= '0';
            set_e2p_proc <= proc_s0v;
         end if;
       when others =>
          set_e2p_proc <= b"XX";
     end case;
   end if;
 end process set_e2prom_proc;
```

--- end STATE_MACHINE1;

We claim:

1. A device for connection to a local bus in a host computer, the device comprising:

a bus interface circuit for coupling to the local bus;

a non-volatile memory; and an address selection circuit which provides to the bus interface circuit a signal indicating a device address at which the host computer can access the device on the local bus, wherein the address selection circuit is:

operable in a first mode such that the address election circuit selects as the device address an address indicated by an index saved in the non-volatile memory; and operable in a second mode such that during initialization of the host computer, the address selection circuit changes the index saved in the non-volatile memory and selects the device address an address indicated by the changed index.

2. The device of claim 1, wherein the address selection circuit further comprises manually operable means for switching from the first to the second mode.

3. The device of claim 2, wherein the means for switching comprises a manually operable switch.

4. The device of claim 1, wherein the address selection circuit further comprises an address list circuit which receives an input signal representing the index and generates an output signal representing the device address which corresponds to the index.

5. The device of claim 4, wherein the address selection circuit comprises:

a register set; and control logic operably coupled to the register set, the non-volatile memory, and the address list circuit, wherein:

when the address selection circuit operates in the first mode, the control logic causes the index to be written from the non-volatile memory to the register set then causes the address list circuit to write into the register set the device address that the address list circuit generates from the index; and when the address selection circuit operates in the second mode, the control logic causes the index to be written from the non-volatile memory to the register set, changes the index in the non-volatile memory, and causes the address list circuit to write into the register set the device address which the address list circuit generates from the changed index.

6. The device of claim 5, wherein the register set comprises:

a first register for the index from the non-volatile memory; and a second register for the device address generated by the address list circuit.

7. An address selection circuit for use in a device connected to a local bus in a host computer, wherein the address selection circuit selects a device address at which the host computer accesses the device on the local bus, the address selection circuit comprising:

a non-volatile memory;

an address list circuit which generates an output signal indicating an address corresponding to an index indicated by an input signal; and control logic operably coupled to the non-volatile memory and the address list circuit, wherein:

when the address selection circuit operates in a first mode, the control logic causes a signal indicating an index from the non-volatile memory to be asserted to the address list circuit, wherein the address list circuit generates and output signal indicating the device address which corresponds to the index; and when the address selection circuit operates in a second mode, the control logic changes the index in the non-volatile memory and causes a signal indicating the changed index to be asserted to the address list circuit, wherein the address list circuit generates an output signal indicating the device address which corresponds to the changed index.

8. The address selection circuit of claim 7, further comprising a register set which comprises:

a first register for the index from the non-volatile memory; and a second register for the device address generated by the control logic.

9. The address selection circuit of claim 7, further comprising a manually operable switch that controls whether the address selection circuit is in first mode or the second mode.

* * * * *